May 19, 1964  C. W. LANG ETAL  3,134,041
BRUSH BLOCK AND BRUSHES FOR ROTOR
Filed Sept. 9, 1959  3 Sheets-Sheet 1

INVENTORS
CHARLES W. LANG
ARCH L. TERWILLIGER
LEWIS I. GLASER

Sidney G. Faber
ATTORNEYS

May 19, 1964  C. W. LANG ETAL  3,134,041
BRUSH BLOCK AND BRUSHES FOR ROTOR
Filed Sept. 9, 1959  3 Sheets-Sheet 2
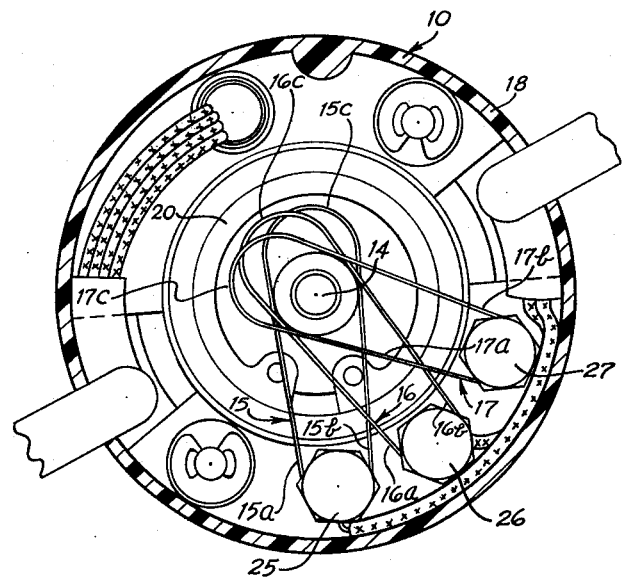
Fig. 2
INVENTORS
CHARLES W. LANG
ARCH L. TERWILLIGER
LEWIS I. GLASER
ATTORNEYS May 19, 1964
C. W. LANG ETAL
3,134,041
BRUSH BLOCK AND BRUSHES FOR ROTOR
Filed Sept. 9, 1959
3 Sheets—Sheet 3
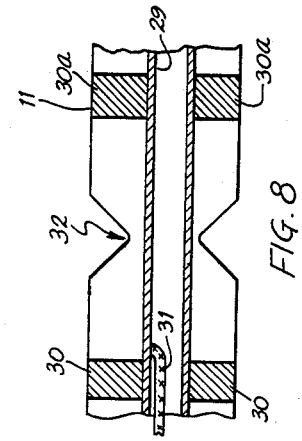
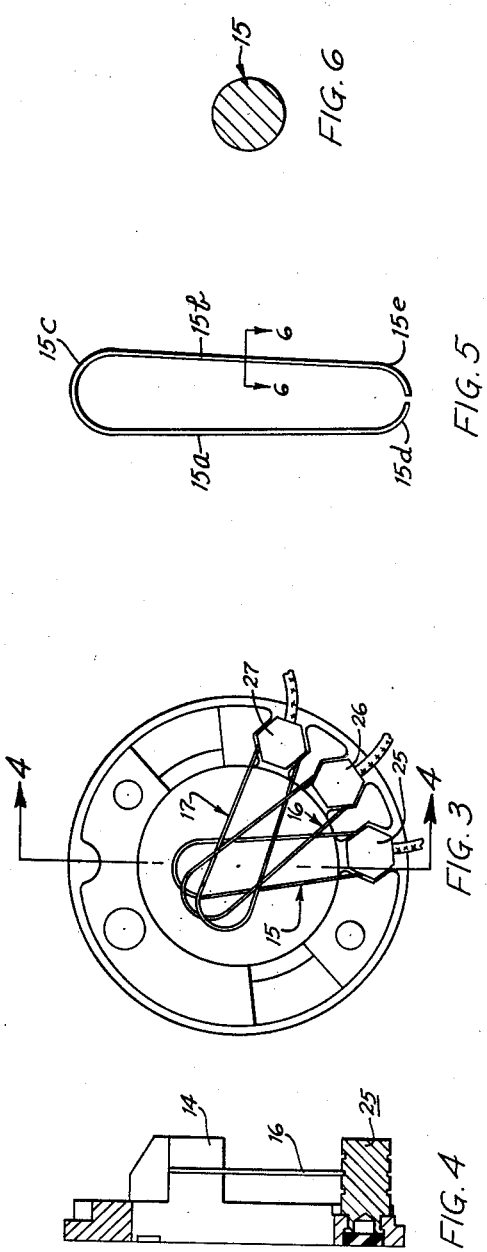
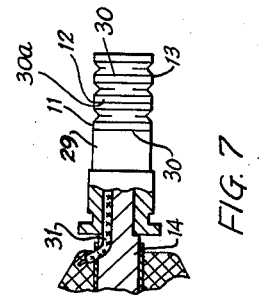
INVENTORS
CHARLES W. LANG
ARCH L. TERWILLIGER
LEWIS I. GLASER
BY Sidney G. Faber
ATTORNEYS United States Patent Office 3,134,041
Patented May 19, 1964

3,134,041
BRUSH BLOCK AND BRUSHES FOR ROTOR
Charles W. Lang, Pompton Plains, Arch L. Terwilliger, North Caldwell, and Lewis I. Glaser, East Paterson, N.J., assignors to General Precision, Inc., a corporation of Delaware
Filed Sept. 9, 1959, Ser. No. 838,996
9 Claims. (Cl. 310—239)

This invention generally relates to improvements in miniature brush and slip ring assemblies useful in many precision instruments for electrically interconnecting a fixed terminal with a rotatable terminal and is particularly concerned with such connectors that can withstand rapid vibrations, shock and accelerations without losing electrical contact.

Although the present invention has many applications, it is particularly well suited for use in motors, synchros, gyro motors, and other extremely small devices carried by aircraft, missiles and like vehicles that experience rapid movement and acceleration.

For the control and navigation of such vehicles there are provided many such synchros, and like devices in various combinations which require the interconnection of electrical signals and power to and from a spinning rotor through brush and slip ring assemblies. In present day aircraft applications, for example, the vast number of such synchros used and the severe weight limitations have required that such electrical connectors be miniaturized and subminiaturized to a degree considered impossible but a short time ago. For example, the assignee of the present invention is presently producing a family of miniature synchros known as the Kearfoot "Penny Size" synchros whose outer dimensions are less than two inches in length and one inch in diameter, and whose total weight is less than four ounces. In such miniature devices, the slip rings have outer diameters measuring only tenths of an inch, and are machined to tolerances in ten thousandths of an inch, and the brushes have thicknesses measuring only a few thousandths of an inch.

In such devices there exists a critical problem in constructing the tiny slip ring and brush assemblies for minimum friction and adequate insulation and separation of the circuits, yet providing sufficient ruggedness to resist large forces of vibration, acceleration and shock and thereby maintain the essential electrical contact continuously despite these conditions. The extent of the problem involved is realized by noting that such slip ring connectors must withstand vibrational frequencies of at least 2000 cycles per second having amplitudes of about .10 inch in each coordinate plane, or applied accelerations of at least twenty times greater than gravity or 20 G's. Furthermore, it is desirable that the slip ring connectors withstand more severe vibrations of up to 4000 c.p.s. or greater and accelerations of 40 G's to fully resist the rapid movement experienced in aircraft and missiles.

To overcome this problem according to the present invention there is provided a uniquely constructed connector assembly comprising a plurality of slip rings and brushes therefor, wherein each brush is provided with two arms to straddle and contact opposite sides of the rotatable ring, and the opposite ends of each arm are disposed to engage a fixed contact. To insure that at least one of the arms always engages the ring even when the assembly is experiencing the most rapid change in acceleration, or the most abruptly imposed shock or high frequency vibration, there is provided means for tying together or joining the arms at a position proximate to the slip ring. By joining the two arms at this position, an accelerating force tending to pull one arm away from the ring to break electrical contact therewith results in pushing the other arm more firmly against the ring, whereby the arms are selectively operated in push-pull relationship to maintain engagement with the ring in response to transversely directed forces and both maintained in continuous engagement therewith by forces lengthwise of the brush arms. According to another feature of the invention, the means interconnecting the brush arms is preferably resilient to exert a continuous spring biasing force against the arms directed toward the slip ring, thereby insuring good electrical contact while providing the push-pull action described above to resist displacing forces.

It is accordingly a primary object of the invention to provide an improved slip ring and brush connector of minimum weight and dimensions and capable of resisting large accelerational and vibrational forces without losing electrical contact even momentarily.

A further object is to provide a multiple connector assembly of this type of simplified construction.

A still further object is to provide a more rugged and durable electrical connector of miniature weight and dimension for electrically interconnecting a fixed terminal and rotatable terminal.

Other objects and many attendant advantages will be more readily understood by those skilled in the art after a detailed consideration of the following specification taken with the accompanying drawings wherein:

FIGURE 2 is a cross-section view taken along lines 2—2 of FIGURE 1;

FIGURE 3 is an end view similar to FIGURE 2 illustrating the brush block structure and brushes;

FIGURE 4 is a sectional view taken along lines 4—4 of FIGURE 3;

FIGURE 5 is a side elevation of one preferred hair wire brush according to the present invention;

FIGURE 6 is a cross-sectional view through lines 6—6 of FIGURE 5, illustrating the preferred circular cross-section of the wire;

FIGURE 7 is an enlarged view partially inside of the slip rings and supporting shaft therefor; and FIGURE 8 is an enlarged view of a portion of one preferred slip ring construction showing a V-shaped groove thereof.

Figure 1:
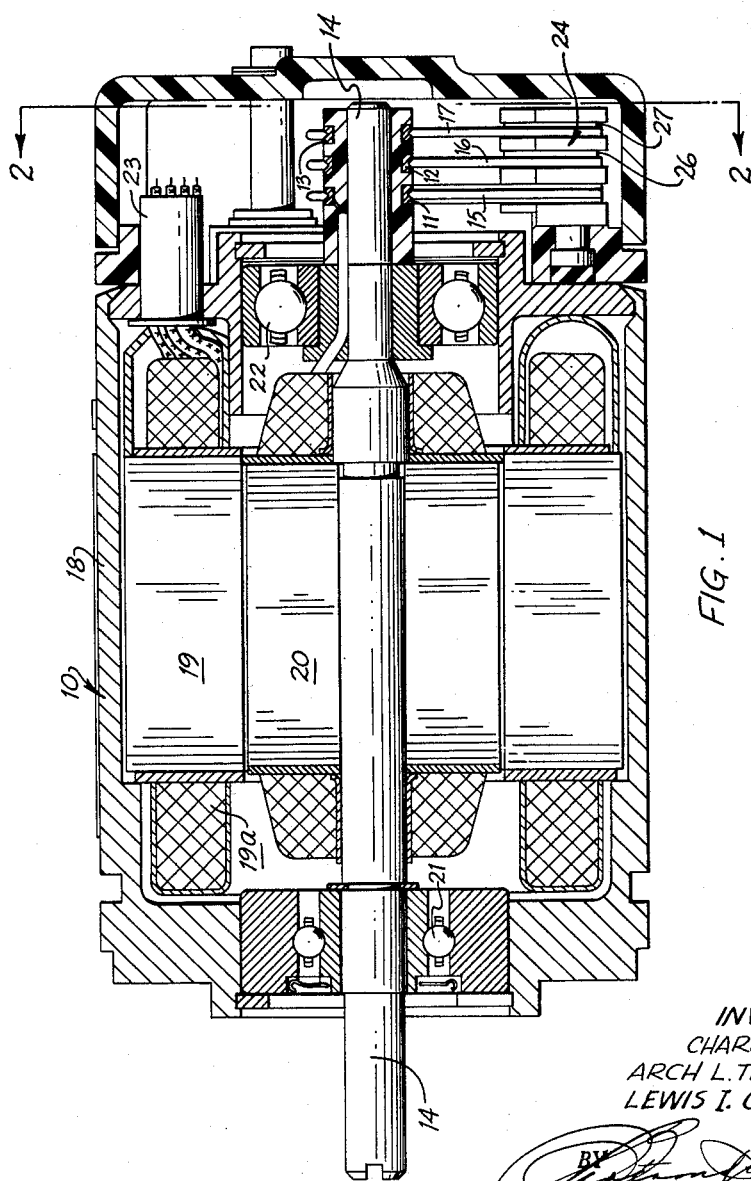
FIGURE 1 is a longitudinal section through a synchro illustrating the location and connections of a preferred slip ring and brush assembly according to the present invention.

Referring now to the drawings for a detailed consideration of one preferred embodiment of the invention, there is shown in FIGURE 1 a synchro device 10 incorporating a plurality of slip rings 11, 12, 13 mounted on a rotatable shaft 14, which slip rings are adapted to be slidably engaged by brushes 15, 16, and 17 respectively, to continuously make electrical contact between fixed terminals generally indicated as 24 on the case and the rotating slip rings to supply electrical signals to or from the fixed terminals to the slip rings.

As shown, the synchro 10 generally comprises an outer case 18 fixedly supporting field or stator laminations 19 and windings 19a, and a rotor member 20 including a plurality of windings supported on a central shaft 14 that coaxially passes through the case and is rotatably supported therein by bearings 21 and 22 to enable rotative displacement between the stator and rotor windings.

As well known to those skilled in the art, synchros of this general type are employed as transmitters, repeaters, control transformers and the like, wherein A.-C. voltages are fed into or out of the stator windings through fixed terminals 23 supported by the case 10 and voltages are fed into or out of the rotor windings by means of relatively slidable contactors, such as the slip rings 11 to 13 and brushes 15 to 17, each of which interconnect a different one of the fixed terminals 24 supported on the case with a different one of the slip rings supported on the shaft and electrically connected to a rotor winding.

Visualizing the synchro illustrated in FIGURE 1 as being an enlarged representation of an actual miniature synchro, it is evident that the slip rings 11 to 13 are quite small in diameter and closely spaced apart on the shaft 14, although electrically insulated from one another, and that the brushes 15 to 17, inclusive, for making sliding engagement therewith are actually fine hairlike wires. In actual practice, the slip rings are preferably made of fine gold alloy material for good electrical contact and non-corrosion properties and the brushes are likewise made of gold alloyed with silver, platinum, copper and zinc; the latter being added for strength and spring like resilience.

As best shown by the enlarged end views of FIGURES 2 and 3, each of the brushes 15, 16, and 17, is provided with two arms 15a, 15b, 16a, 16b, and 17a, 17b adapted to straddle and engage opposite sides of the gold slip rings thereby to make electrical contact with the brushes at two positions on opposite sides thereof. In each brush, the lower ends of each arm are suitably connected to one of the fixed terminals 25, 26, 27 and the upper ends thereof are fastened together, preferably by forming each brush of an integral piece of hair wire and bending the wire to form an upper loop above the slip ring, as shown. According to the present invention, the brush wires 15, 16, and 17 are formed with a sufficient spring temper to provide a high degree of resiliency and the upper looped portions thereof are arcuately formed in substantially semi-circular forms 15c, 16c, 17c as shown, with the side arms urged inwardly by the loops to engage the slip rings. In other words, before the brushes are positioned to engage the slip rings, the upper loop is so shaped that the two side arms are adjusted toward one another with a spacing between them that is less than the diameter of the slip ring. Further, the loop is carefully adjusted during the shaping thereof so that each arm normally engages its slip ring with a predetermined pressure contact, thereby insuring the proper slidable engagement of the elements.

For fastening the lower end portions of each pair of arms to its fixed terminal, the lower end of each arm of the brush is also preferably bent inwardly toward the other as shown at 15d and 15e in FIGURE 5, thereby to detachably but firmly grip a cylindrical portion of the fixed contact (FIGURE 1). The fixed contacts 25, 26, 27 are also provided with enlarged headed portions on opposite sides on the cylindrical portions, as shown by the hexagon shaped heads in FIGURES 2 and 3, serving as stops to prevent the brush arms from sliding axially along the fixed contacts.

FIGURES 7 and 8 illustrate further details of the preferred slip ring construction and assembly. As shown in FIGURE 7, all of the slip rings are mounted in side-by-side relation coaxially on a hollow supporting stub extension shaft 29 with suitable insulation between the extension shaft 29 and the slip rings, and between the several slip rings themselves. Individual insulated spacer rings 30, 30a are located between adjacent slip rings, as shown in FIGURES 7 and 8. Through the hollow extension shaft 29, the individual connecting wires 31 are threaded and soldered or otherwise fastened to the underside of the slip rings. The other ends of the connecting leads or wires 31 are directed to the various windings on the rotor, thereby to interconnect the slip rings with the rotor windings.

To prevent side movement of the brush arms along the slip rings, each of the slip rings are preferably formed with a notched or V-grooved portion 32 centrally about their periphery, as best shown in FIGURE 8, thereby to accommodate the hair wire brush arms, and prevent such side movement.

As described, therefore, there is provided a unique brush and slip ring construction employing a pair of arms to grip opposite sides of each slip ring and wherein the arms are tied or fastened together at a position close to the slip ring. This construction restricts the movement of each arm by attaching it to the other located on the opposite side of the slip ring, thereby to provide a more rugged rotatably slidable electrical connection that can withstand considerably great shock, vibration and accelerational forces without momentarily losing electrical contact. More specifically, if a transversely directed force pulls one brush arm away from the slip ring, this force is transmitted through the wire loop or other tying means interconnecting the arms to push or pull the other arm more tightly against the slip ring and improve the electrical contact therebetween. In addition, each slip ring is provided with a V-groove or notch to prevent movement of the brush arms axially along the slip ring, whereby this combination of elements permits electrical contact to be continuously made despite extremely high externally applied vibrations and shock.

Although this invention has been described in connection with an exemplary embodiment thereof, it is to be understood that variations in its application and modifications in its construction and arrangement may be made within the broader spirit and scope of the invention as described in the appended claims.

What is claimed is:

1. In a miniature electrical connector for shock and vibration proof applications and including a substantially fixed wire contactor for slidably engaging a rotating conductive slip ring, said wire contactor comprising a generally elongated O-shaped wire element to substantially encircle said rotating slip ring with one loop portion closely spaced to said slip ring to pass around said ring and with the side arms straddling opposite sides of the slip ring and being biased toward each other to less than the diameter of the slip ring by said loop portion, and with an opposite looped portion substantially encircling a fixed terminal and being spring biased by said loop portion, to continuously maintain electrical contact therewith, said opposite loop portion being split with the opposing arcuate portions spring biased to slidably engage said fixed terminal.

2. In the connector of claim 1, said opposite loop portion being split with the opposing arcuate portions spring biased to slidably engage said fixed terminal.

3. In a shock and vibration proof brush and slip ring assembly for electrically interconnecting a fixed cylindrical terminal with a rotating slip ring, said brush including a pair of arms engaging opposite sides of said terminal and slip ring, integral means fastening the ends of the arms proximate the slip ring to elastically urge said arms together against the slip ring and means associated with said arms proximate said fixed terminal to slidably engage said fixed terminal, said slip ring having a greater diameter than said fixed terminal whereby said integral fastening means also urges said arms to engage the sides of the fixed terminal, the ends of the arms of said brush, near the fixed terminal being arcuately bent inwardly toward one another to substantially encircle the surface portion of the fixed terminal remote from the slip rings.

4. In a shock and vibration proof brush and slip ring assembly for electrically interconnecting a fixed cylindrical terminal with a rotating slip ring, the diameter of the fixed terminal being less than that of the slip ring, said brush consisting of an integral spring wire formed to frictionally engage both the slip ring and the fixed terminal, said brush comprising a pair of wire arms inclined toward one another and engaging opposite sides of both the slip ring and terminal, an integral loop portion connecting the arms at one end at a position close to but spaced from the slip ring to elastically urge said arms together to engage both the slip ring and fixed terminal, and the opposite ends of the arms being unconnected and arcuately bent inwardly toward one another to substantially encircle the surface portions of the fixed terminal remote from the slip ring.

5. A miniature brush formed of an integral length of fine spring wire being configured to continuously maintain electrical contact by sliding engagement between a rotating slip ring and a fixed cylindrical terminal with the brush slidably engaging both the slip ring and the terminal despite vibration and acceleration forces, said brush consisting of a pair of elongated substantially linear straight arms, an integrally formed and enlarged circular loop portion interconnecting the arms at one end thereof and elastically urging the arms toward one another, said loop having a greater arcuate diameter than that of the slip ring, and the opposite ends of each arm being unconnected to the other arm and being circularly bent inwardly toward the other at an arcuate diameter that is smaller than that of the loop portion.

6. In a miniature brush and rotating slip ring assembly for maintaining continuous electrical contact between the brush and slip ring despite rapid vibration and accelerational forces, said brush including a pair of wire arms for slidably engaging opposite sides of the slip ring and having the opposite ends thereof engaging a fixed terminal, and force exerting means interconnecting said arms at a position close to but spaced from said slip ring to urge said arms toward one another about said slip ring, said interconnecting means being resilient and exerting a biasing force urging each arm toward the other to engage said slip ring, said wire arms having a circular cross-section, said interconnecting means comprising an integral extension of said wire arms, said integral extension of said arms forming a resilient arcuate loop from one arm to the other and closely spaced from said slip ring.

7. In a miniature brush and rotating slip ring assembly for maintaining continuous electrical contact between the brush and slip ring despite rapid vibration and accelerational forces, said brush including a pair of wire arms for slidably engaging opposite sides of the slip ring and having the opposite ends thereof engaging a fixed terminal, and force exerting means interconnecting said arms at a position close to but spaced from said slip ring to urge said arms toward one another about said slip ring, said interconnecting means being resilient and exerting a biasing force urging each arm toward the other to engage said slip ring, said wire arms having a circular cross-section, said interconnecting means comprising an integral extension of said wire arms, said integral extension of said arms forming a resilient arcuate loop from one arm to the other and closely spaced from said slip ring, said slip ring having a groove formed therein to accommodate said wire arms and prevent axial displacement thereof along the axis of the slip ring.

8. In a miniature brush and rotating slip ring assembly for maintaining continuous electrical contact between the brush and slip ring despite rapid vibration and accelerational forces, said brush including a pair of wire arms for slidably engaging opposite sides of the slip ring and having the opposite ends thereof engaging a fixed terminal, and force exerting means interconnecting said arms at a position close to but spaced from said slip ring to urge said arms toward one another about said slip ring, said interconnecting means being resilient and exerting a biasing force urging each arm toward the other to engage said slip ring, said wire arms having a circular cross-section, said interconnecting means comprising an integral extension of said wire arms, said integral extension of said arms forming a resilient arcuate loop from one arm to the other and closely spaced from said slip ring, said slip ring having a groove formed therein to accommodate said wire arms and prevent axial displacement thereof along the axis of the slip ring, a plurality of spaced slip rings supported on a rotatable shaft and insulated therefrom and from each other, and a plurality of said brushes, one of each of said brushes being fitted to each slip ring.

9. In a shock and vibration proof brush and slip ring assembly for electrically interconnecting a fixed cylindrical terminal with a rotating slip ring, said brush including a pair of arms engaging opposite sides of said terminal and slip ring, integral means fastening the ends of the arms proximate the slip ring to elastically urge said arms together against the slip ring and means associated with said arms proximate said fixed terminal to slidably engage said fixed terminal, said slip ring having a greater diameter than said fixed terminal whereby said integral fastening means also urges said arms to engage the sides of the fixed terminal, the ends of the arms of said brush, near the fixed terminal being arcuately bent inwardly toward one another to substantially encircle the surface portion of the fixed terminal remote from the slip rings, said brush being integrally formed of fine spring wire and said fastening means being an arcuately shaped extension of the arms passing around but spaced from the surface portions of the slip ring remote from the fixed terminal, said slip ring being formed with a peripheral groove of substantially V-cross-section, to accommodate said brush arms thereby to prevent displacement of the arms coaxially along the slip ring.

References Cited in the file of this patent

UNITED STATES PATENTS

| 290,350 | Paine | Dec. 18, 1883 |
| 1,300,239 | Berst | Apr. 15, 1919 |
| 2,182,224 | Dunn | Dec. 5, 1939 |
| 2,451,959 | Knudsen | Oct. 19, 1948 |
| 2,509,931 | Krantz | May 30, 1950 |
| 2,877,435 | Alvine | Mar. 10, 1959 |

FOREIGN PATENTS

| 19,529 | Great Britain | of 1889 |